United States Patent
Enoki et al.

(10) Patent No.: US 10,764,516 B2
(45) Date of Patent: Sep. 1, 2020

(54) IMAGE SENSOR AND ELECTRONIC DEVICE

(71) Applicant: Sony Corporation, Tokyo (JP)

(72) Inventors: Koji Enoki, Kanagawa (JP); Hiroshi Sumihiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/578,430

(22) PCT Filed: Jun. 17, 2016

(86) PCT No.: PCT/JP2016/068050
§ 371 (c)(1),
(2) Date: Nov. 30, 2017

(87) PCT Pub. No.: WO2017/002639
PCT Pub. Date: Jan. 5, 2017

(65) Prior Publication Data
US 2018/0167566 A1   Jun. 14, 2018

(30) Foreign Application Priority Data
Jun. 30, 2015   (JP) .................... 2015-130949

(51) Int. Cl.
*H04N 5/345*   (2011.01)
*H04N 5/262*   (2006.01)
(52) U.S. Cl.
CPC .......... *H04N 5/345* (2013.01); *H04N 5/2628* (2013.01)

(58) Field of Classification Search
CPC .... H04N 5/345; H04N 5/2628; H04N 5/3456; G06T 1/60
See application file for complete search history.

(56) References Cited

U.S. PATENT DOCUMENTS 6,680,748 B1 * 1/2004 Monti .................... H04N 3/155
                                                        348/143
9,350,928 B2 * 5/2016 Keelan ................. H04N 5/3745
(Continued)

FOREIGN PATENT DOCUMENTS

JP   2006-087565 A   4/2006
JP   2008-048313 A   2/2008
(Continued)

*Primary Examiner* — Nhan T Tran
(74) *Attorney, Agent, or Firm* — Michael Best & Friedrich LLP

(57) ABSTRACT

An image sensor and an electronic device are disclosed. They are configured to output, from the image sensor, a plurality of different pieces of image data based on a full-size original image. In one example, an image sensor includes: a pixel unit that generates a full-size original image corresponding to incident light with many photoelectric conversion elements; a holding unit that has a capacity capable of holding at least the full-size original image; an image processing unit that generates a full-size processed image by performing predetermined image processing with respect to the full-size original image; and a modification unit that generates a modified-size processed image by modifying a size of the full-size processed image. The full-size processed image and the modified-size processed image are output. Applications include a CMOS image sensor in which a DRAM is installed.

12 Claims, 15 Drawing Sheets

(56) References Cited

U.S. PATENT DOCUMENTS

| | | | |
|---|---|---|---|
| 2002/0111188 A1* | 8/2002 | Harma | H04N 5/2251 455/556.1 |
| 2004/0085462 A1* | 5/2004 | Sasaki | G06T 1/20 348/231.6 |
| 2008/0042046 A1* | 2/2008 | Mabuchi | H01L 27/14634 250/208.1 |
| 2011/0157395 A1* | 6/2011 | Compton | H04N 5/335 348/222.1 |
| 2011/0310264 A1* | 12/2011 | Kim | H04N 5/23245 348/222.1 |

FOREIGN PATENT DOCUMENTS

| | | |
|---|---|---|
| JP | 4337549 B2 | 9/2009 |
| JP | 2013-058970 A | 3/2013 |
| WO | 2014/007004 A1 | 1/2014 |

* cited by examiner

IMAGE SENSOR AND ELECTRONIC DEVICE

TECHNICAL FIELD

The present disclosure relates to an image sensor and an electronic device, and specifically relates to an image sensor and an electronic device that can output a plurality of pieces of image data at timing corresponding to a request from a system.

BACKGROUND ART

Conventionally, due to a problem such as a size or a cost, it has been difficult to install storage, which has a capacity capable of holding pixel data of all pixels (hereinafter, also referred to as full-size original image) as it is, in an image sensor in which an imaging element such as a CMOS or a CCD is installed.

However, recently, it is becoming possible to install, in an image sensor, storage that can hold a full-size original image (see, for example, Patent Document 1).

CITATION LIST

Patent Document

Patent Document 1: Japanese Patent No. 4337549

SUMMARY OF THE INVENTION

Problems to be Solved by the Invention

Various methods for using an image sensor in which storage capable of holding a full-size original image is installed are looked for.

The present disclosure is provided in view of such a situation and is to make it possible to output, from an image sensor in which storage is installed, a plurality of different pieces of image data based on a full-size original image.

Solutions To Problems

An image sensor that is a first aspect of the present disclosure includes: a pixel unit that generates a full-size original image corresponding to incident light with many photoelectric conversion elements; a holding unit that has a capacity capable of holding at least the full-size original image; an image processing unit that generates a full-size processed image by performing predetermined image processing with respect to the full-size original image read from the holding unit; and a modification unit that generates a modified-size processed image by modifying a size of the full-size processed image, in which the full-size processed image and the modified-size processed image are output.

In the image sensor that is the first aspect of the present disclosure, the holding unit may have a capacity capable of holding at least the full-size original image, the full-size processed image, and the modified-size processed image, the pixel unit may make the holding unit hold the generated full-size original image, the image processing unit may make the holding unit hold the full-size processed image generated by the predetermined image processing performed with respect to the full-size original image read from the holding unit, and the modification unit may make the holding unit hold the modified-size processed image generated by modification of the size of the full-size processed image. A selective output unit that selectively reads the the full-size processed image or the modified-size processed image from the holding unit and performs an output thereof may be further included.

In the image sensor that is the first aspect of the present disclosure, the pixel unit may make the holding unit hold the generated full-size original image, the image processing unit may output the full-size processed image generated by the predetermined image processing performed with respect to the full-size original image read from the holding unit and may also supply this to the modification unit, and the modification unit may output a modified-size processed image generated by modification of a size of the full-size processed image supplied by the image processing unit.

In the image sensor that is the first aspect of the present disclosure, the pixel unit may make the holding unit hold the generated full-size original image, the image processing unit may supply, to the modification unit, the full-size processed image generated by the predetermined image processing performed with respect to the full-size original image read from the holding unit, and the modification unit may output a modified-size processed image generated by modification of a size of the full-size processed image supplied by the image processing unit and may also directly output the full-size processed image supplied by the image processing unit.

In the image sensor that is the first aspect of the present disclosure, the holding unit may have a capacity capable of holding at least the full-size original image and the full-size processed image, the pixel unit may make the holding unit hold the generated full-size original image, the image processing unit may make the holding unit hold the full-size processed image generated by the predetermined image processing performed with respect to the full-size original image read from the holding unit, and the modification unit may output a modified-size processed image generated by modification of a size of the full-size processed image read from the holding unit and may also directly output the full-size processed image read from the holding unit.

In the image sensor that is the first aspect of the present disclosure, the holding unit may have a capacity capable of holding at least the full-size original image and the full-size processed image, the pixel unit may make the holding unit hold the generated full-size original image, the image processing unit may supply, to the modification unit, the full-size processed image generated by the predetermined image processing performed with respect to the full-size original image read from the holding unit and may also make the holding unit hold this, and the modification unit may output a modified-size processed image generated by modification of a size of the full-size processed image supplied by the image processing unit and may also directly output the full-size processed image read from the holding unit.

In the image sensor that is the first aspect of the present disclosure, the holding unit may have a capacity capable of holding at least the full-size original image and the modified-size processed image, the pixel unit may make the holding unit hold the generated full-size original image, the image processing unit may output the full-size processed image generated by the predetermined image processing performed with respect to the full-size original image read from the holding unit and may also supply this to the modification unit, and the modification unit may make the holding unit hold a modified-size processed image generated by modification of a size of the full-size processed image supplied by the image processing unit. An output unit that selectively reads the modified-size processed image from the holding unit and performs an output thereof may be further included.

The image sensor that is the first aspect of the present disclosure may further include a size-reduction unit that generates a size-reduced original image by reducing a size of the full-size original image generated by the pixel unit. The holding unit may have a capacity capable of holding at least the full-size original image and the size-reduced original image, the pixel unit may supply the generated full-size original image to the size-reduction unit and also make the holding unit hold this, the size-reduction unit may make the holding unit hold the size-reduced original image generated by reduction of the size of the full-size original image, the image processing unit may generate a size-reduced processed image by performing predetermined image processing with respect to the size-reduced original image read from the holding unit and supply this to the modification unit, and may also supply, to the modification unit, the full-size processed image generated by the predetermined image processing performed with respect to the full-size original image read from the holding unit, and the modification unit may generate a modified-size processed image by modifying a size of the size-reduced processed image supplied by the image processing unit and perform an output thereof, and may also directly output the full-size processed image supplied by the image processing unit.

An electronic device that is a second aspect of the present disclosure is an electronic device including an image sensor, in which the image sensor includes: a pixel unit that generates a full-size original image corresponding to incident light with many photoelectric conversion elements; a holding unit that has a capacity capable of holding at least the full-size original image; an image processing unit that generates a full-size processed image by performing predetermined image processing with respect to the full-size original image read from the holding unit; and a modification unit that generates a modified-size processed image by modifying a size of the full-size processed image, and the full-size processed image and the modified-size processed image are output.

In the first and second aspects of the present disclosure, a full-size original image corresponding to incident light is generated and held in a holding unit, a full-size processed image is generated by predetermined image processing being performed with respect to the full-size original image read from the holding unit, a modified-size processed image is generated by modification of a size of the full-size processed image, and the full-size processed image and the modified-size processed image are output.

Effects of the Invention

According to a first aspect of the present disclosure, it is possible to output a plurality of different pieces of image data based on a full-size original image.

According to a second aspect of the present disclosure, it is possible to output a plurality of pieces of different image data based on a full-size original image from an installed image sensor.

MODE FOR CARRYING OUT THE INVENTION

In the following, the best mode for carrying out the present disclosure (hereinafter, referred to as embodiment) will be described in detail with reference to the drawings.

First Configuration Example of Image Sensor of First Embodiment

Figure 1:
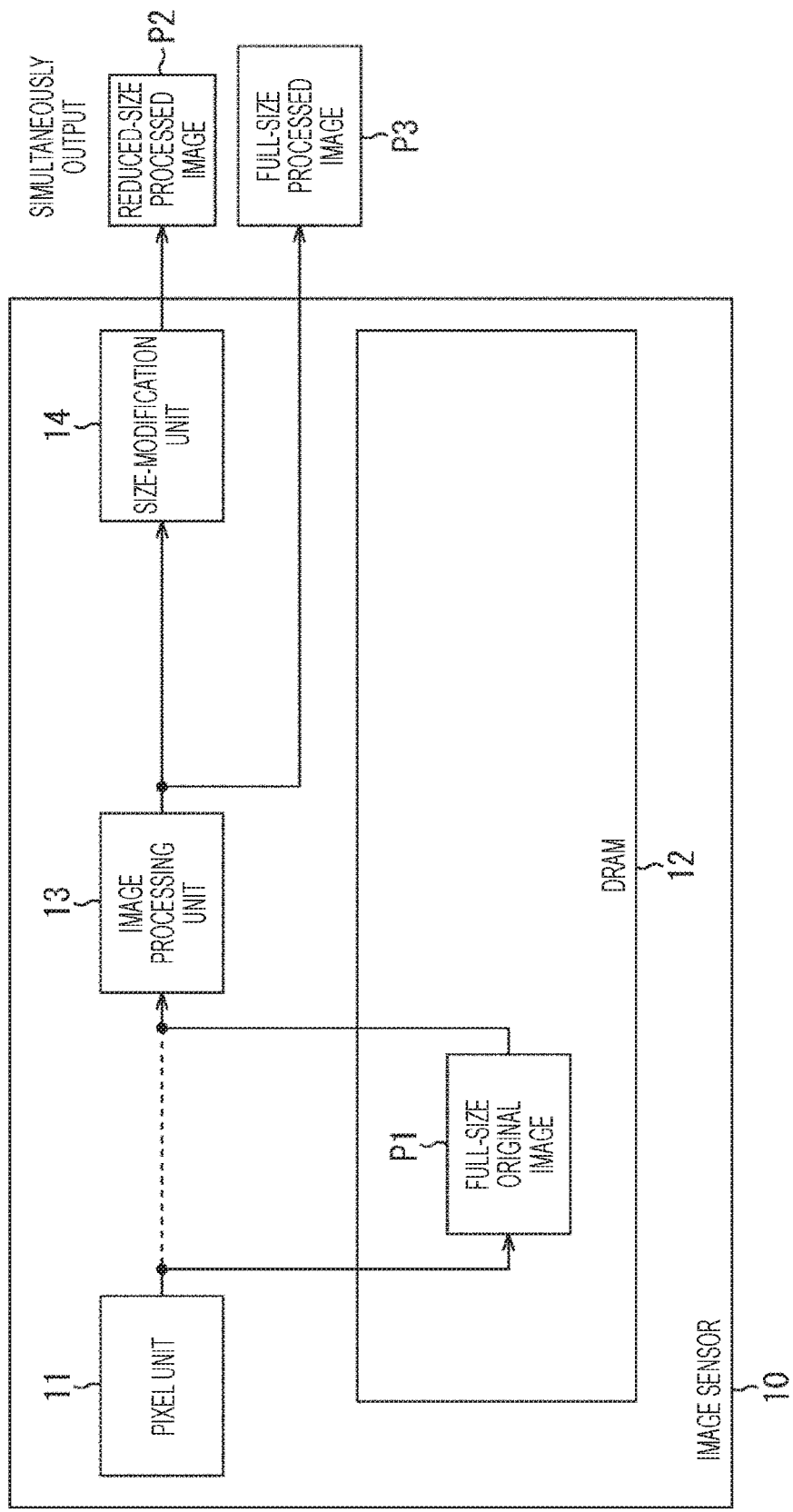
FIG. 1 is a block diagram illustrating a first configuration example of an image sensor to which the present disclosure is applied.

A configuration example of a first configuration example of an image sensor which configuration example is a first embodiment is illustrated in FIG. 1.

This image sensor 10 includes a pixel unit 11, a DRAM 12, an image processing unit 13, and a size-modification unit 14.

The pixel unit 11 includes many photoelectric conversion elements or the like, which generate pixel data by photoelectric conversion in response to incident light, and makes the DRAM 12 hold a full-size original image P1 acquired by imaging. The DRAM 12 is storage having a capacity capable of holding at least a full-size original image P1 and responds to writing by the pixel unit 11 and reading by the image processing unit 13.

The image processing unit 13 performs predetermined image processing such as defective pixel correction with respect to the full-size original image P1, and outputs an accordingly-acquired full-size processed image P3 to a following stage. Note that detailed contents of the image processing in the image processing unit 13 can be arbitrarily modified according to a request from a system in which the image sensor 10 is installed.

The size-modification unit 14 reduces a size of the full-size processed image P3 into a predetermined size, and outputs an accordingly-acquired reduced-size processed image P2 to a following stage. Note that the size-modification unit 14 can increase a size of the full-size processed image P3 into a predetermined size or can perform deformation thereof according to a request from a system in which the image sensor 10 is installed.

Figure 2:
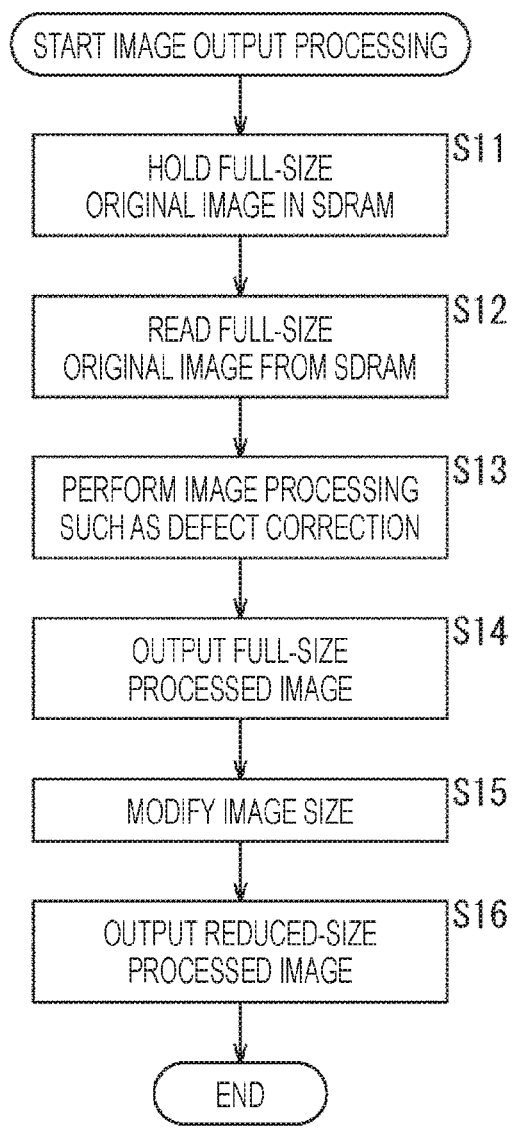
FIG. 2 is a flowchart for describing image output processing by the image sensor in FIG. 1.

FIG. 2 is a flowchart for describing image output processing by the image sensor 10.

In step S11, the pixel unit 11 generates a full-size original image P1 by exposure and makes the DRAM 12 hold the full-size original image P1. The image processing unit 13 reads the full-size original image P1 from the DRAM 12 in step S12, performs predetermined image processing in step S13, and outputs an accordingly-acquired full-size processed image P3 to the size-modification unit 14 and the outside of the image sensor 10 in step S14.

The size-modification unit 14 reduces a size of the full-size processed image P3 into a predetermined size in step S15, and outputs an accordingly-acquired reduced-size processed image P2 to the outside of the image sensor 10 in step S16. This is the end of the image output processing by the image sensor 10.

As described above, according to the image sensor 10, it is possible to output a full-size processed image P3 and a reduced-size processed image P2 at almost the same time only by reading a full-size original image P1 from the DRAM 12 once.

Note that in a case of the image sensor 10, an output from the pixel unit 11 (full-size original image P1) may be output to the image processing unit 13 without the DRAM 12.

Second Configuration Example of Image Sensor of Second Embodiment

Figure 3:
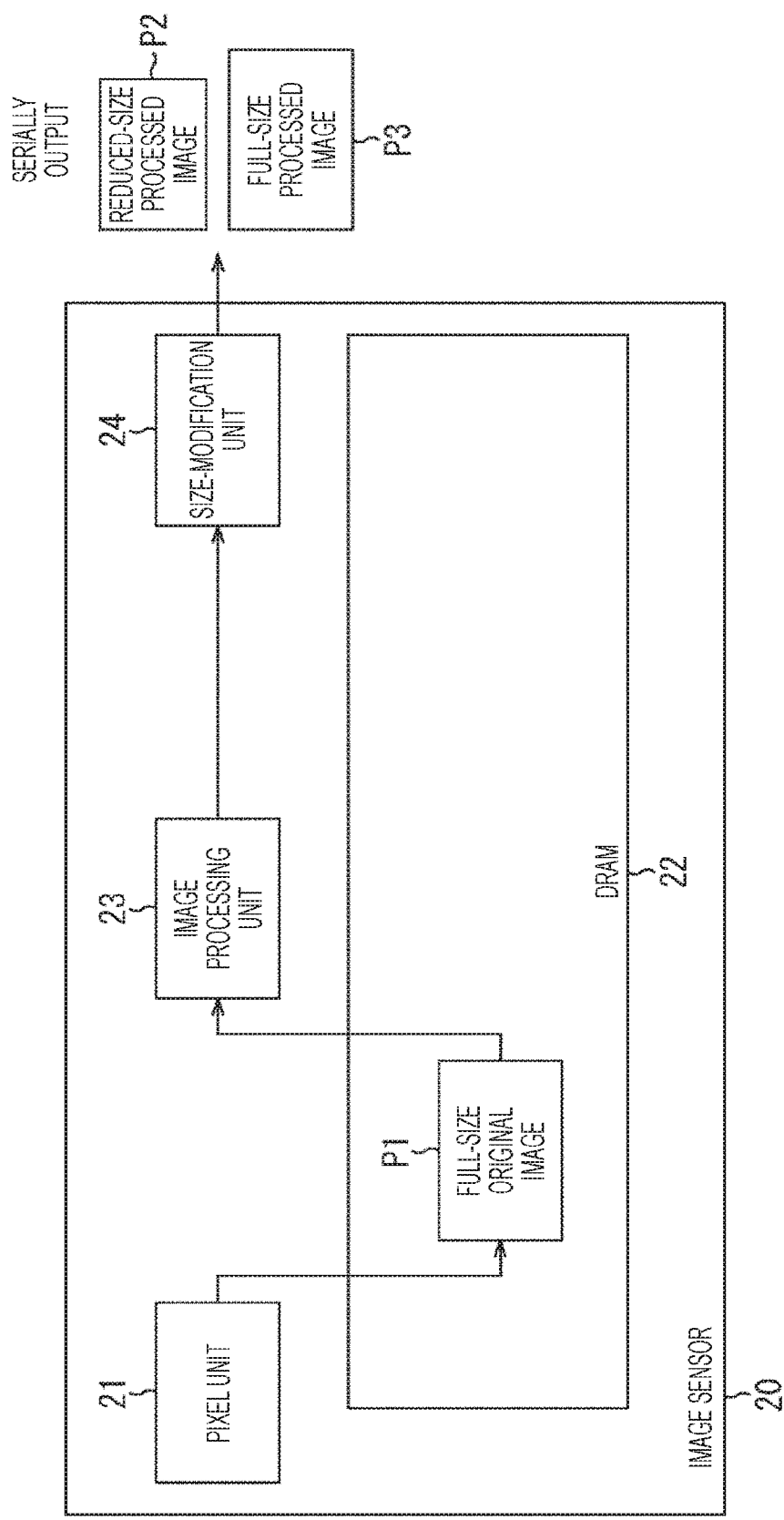
FIG. 3 is a block diagram illustrating a second configuration example of an image sensor to which the present disclosure is applied.

A configuration example of a second configuration example of an image sensor which configuration example is a second embodiment is illustrated in FIG. 3.

This image sensor 20 includes a pixel unit 21, a DRAM 22, an image processing unit 23, and a size-modification unit 24.

The pixel unit 21 includes many photoelectric conversion elements or the like, which generate pixel data by photoelectric conversion in response to incident light, and makes the DRAM 22 hold a full-size original image P1 acquired by imaging. The DRAM 22 is storage having a capacity capable of holding at least a full-size original image P1 and responds to writing by the pixel unit 21 and reading by the image processing unit 23.

The image processing unit 23 performs predetermined image processing such as defective pixel correction with respect to the full-size original image P1, and outputs an accordingly-acquired full-size processed image P3 to a following stage. Note that detailed contents of the image processing in the image processing unit 23 can be arbitrarily modified according to a request from a system in which the image sensor 20 is installed.

The size-modification unit 24 reduces a size of the full-size processed image P3 into a predetermined size, and outputs an accordingly-acquired reduced-size processed image P2 to a following stage. Note that the size-modification unit 24 may also directly output the full-size processed image P3 to a following stage. Also, the size-modification unit 24 can increase a size of the full-size processed image P3 into a predetermined size or can perform deformation thereof according to a request from a system in which the image sensor 20 is installed.

Figure 4:
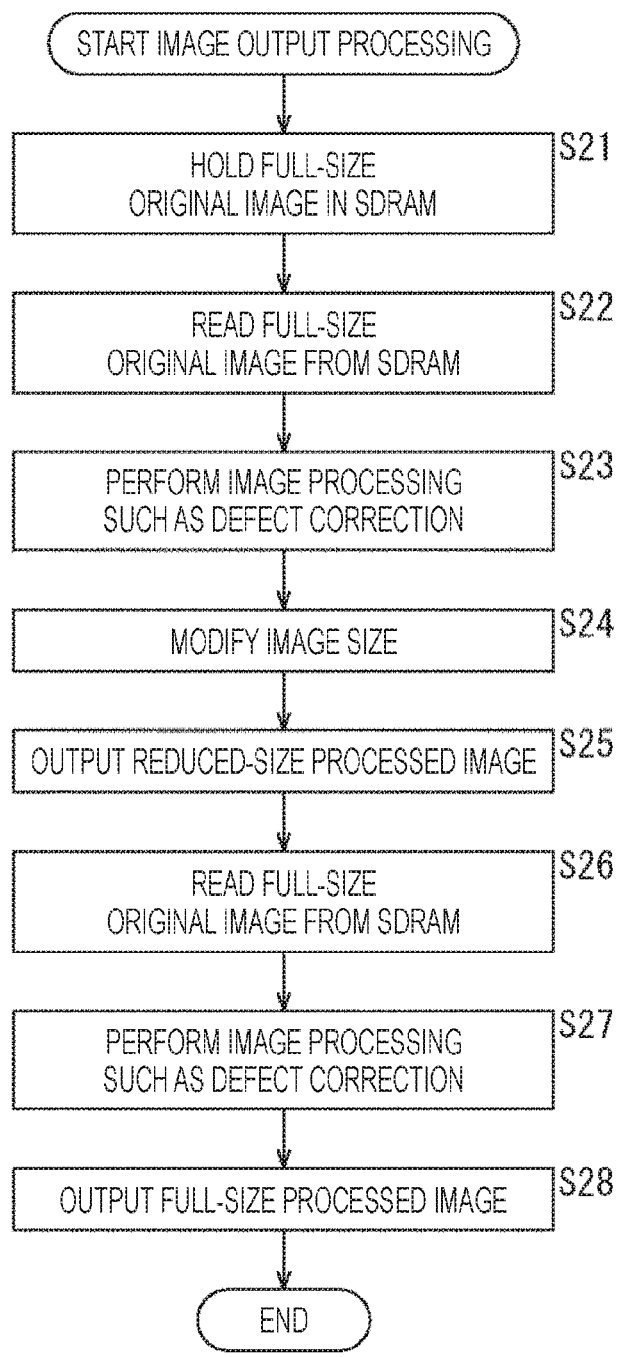
FIG. 4 is a flowchart for describing image output processing by the image sensor in FIG. 3.

FIG. 4 is a flowchart for describing image output processing by the image sensor 20.

In step S21, the pixel unit 21 generates a full-size original image P1 by exposure and makes the DRAM 22 hold the full-size original image P1.

The image processing unit 23 performs first reading of the full-size original image P1 from the DRAM 22 in step S22, and performs predetermined image processing and outputs an accordingly-acquired full-size processed image P3 to the size-modification unit 24 in step S23. The size-modification unit 24 reduces a size of the full-size processed image P3 into a predetermined size in step S24, and outputs an accordingly-acquired reduced-size processed image P2 to the outside of the image sensor 20 in step S25.

The image processing unit 23 performs second reading of the full-size original image P1 from the DRAM 22 in step S26, and performs predetermined image processing and outputs an accordingly-acquired full-size processed image P3 to the size-modification unit 24 in step S27. In step S28, the size-modification unit 24 directly outputs the full-size processed image P3 to the outside of the image sensor 20. This is the end of the image output processing by the image sensor 20.

As described above, according to the image sensor 20, it is possible to serially output a reduced-size processed image P2 and a full-size processed image P3 to the outside of the image sensor 20. Note that the full-size processed image P3 may be output first and the reduced-size processed image P2 may be subsequently output.

Third Configuration Example of Image Sensor of Third Embodiment

Figure 5:
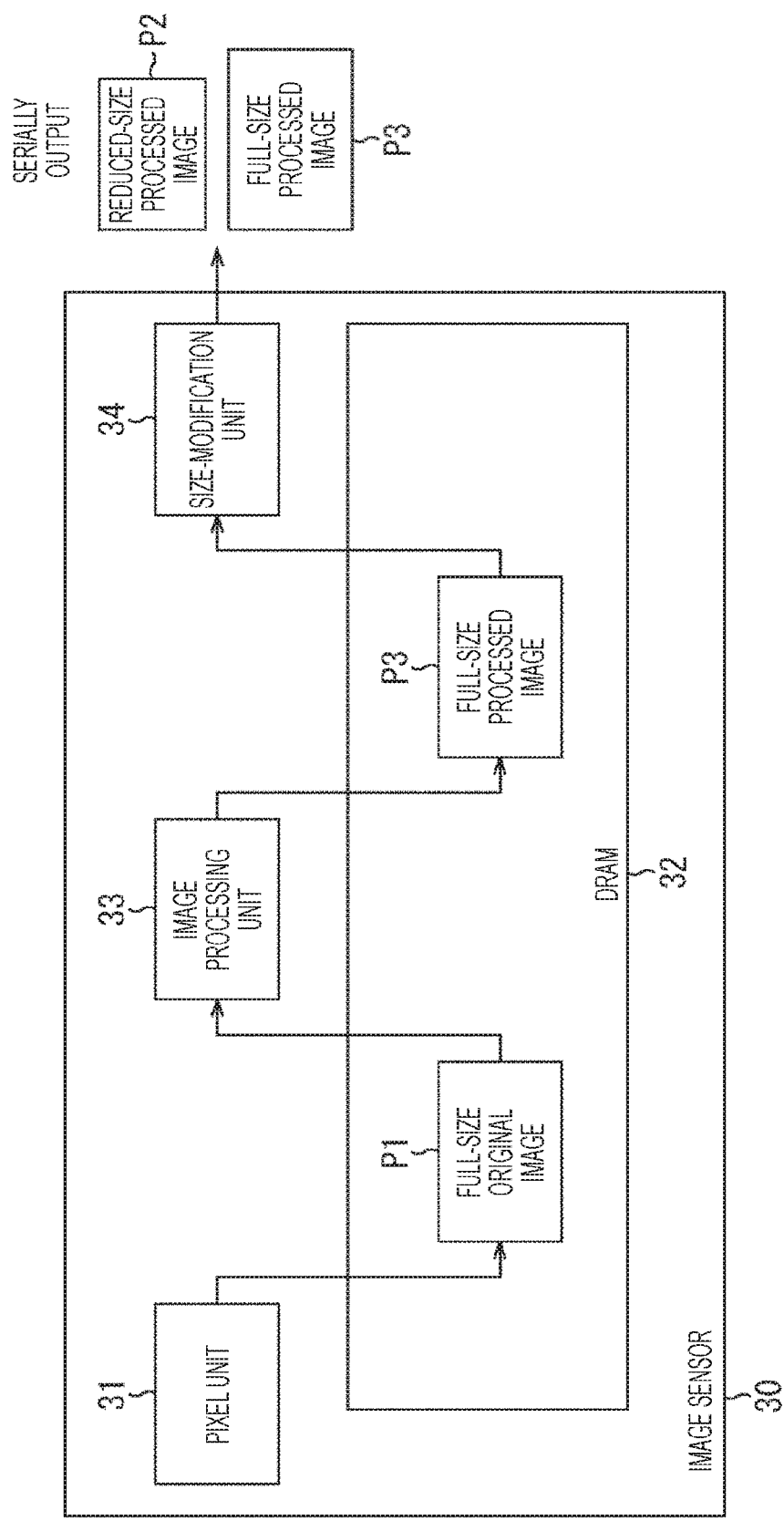
FIG. 5 is a block diagram illustrating a third configuration example of an image sensor to which the present disclosure is applied.

A configuration example of a third configuration example of an image sensor which configuration example is a third embodiment is illustrated in FIG. 5.

This image sensor 30 includes a pixel unit 31, a DRAM 32, an image processing unit 33, and a size-modification unit 34.

The pixel unit 31 includes many photoelectric conversion elements or the like, which generate pixel data by photoelectric conversion in response to incident light, and makes the DRAM 32 hold a full-size original image P1 acquired by imaging. The DRAM 32 is storage having a capacity capable of holding at least a full-size original image P1 and a full-size processed image P3, and responds to writing by the pixel unit 31 and the image processing unit 33 and reading by the image processing unit 33 and the size-modification unit 34.

The image processing unit 33 performs predetermined image processing such as defective pixel correction with respect to a full-size original image P1, and makes an accordingly-acquired full-size processed image P3 output to and held in the DRAM 32. Note that detailed contents of the image processing in the image processing unit 33 can be arbitrarily modified according to a request from a system in which the image sensor 30 is installed.

The size-modification unit 34 reads the full-size processed image P3 from the DRAM 32, generates a reduced-size processed image P2 by reducing a size thereof into a predetermined size, and performs an output thereof to a following stage. Note that the size-modification unit 34 may also directly output the full-size processed image P3 to the following stage. Also, the size-modification unit 34 can increase a size of the full-size processed image P3 into a predetermined size or can perform deformation thereof according to a request from a system in which the image sensor 30 is installed.

Figure 6:
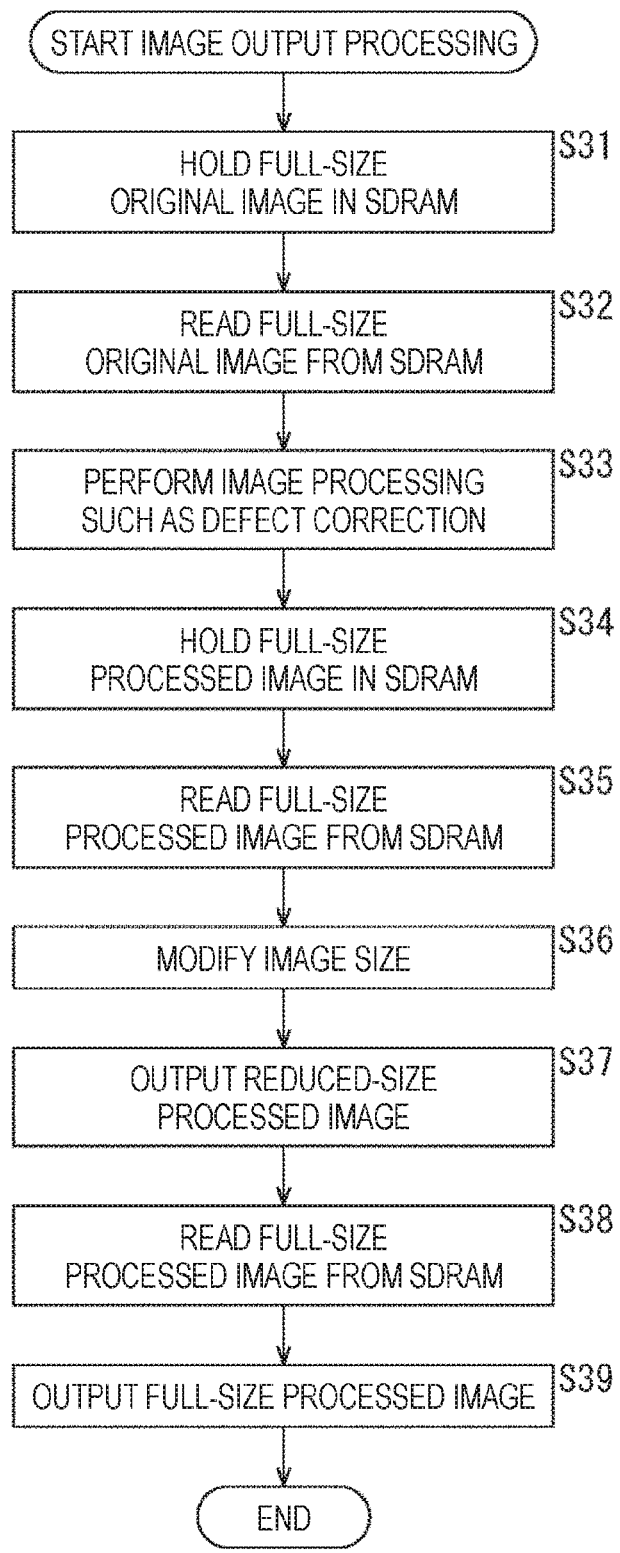
FIG. 6 is a flowchart for describing image output processing by the image sensor in FIG. 5.

FIG. 6 is a flowchart for describing image output processing by the image sensor 30.

In step S31, the pixel unit 31 generates a full-size original image P1 by exposure and makes the DRAM 32 hold the full-size original image P1.

The image processing unit 33 reads the full-size original image P1 from the DRAM 32 in step S32, performs predetermined image processing in step S33, and makes the DRAM 32 hold an accordingly-acquired full-size processed image P3 in step S34.

The size-modification unit 34 performs first reading of the full-size processed image P3 from the DRAM 32 in step S35, reduces a size thereof into a predetermined size in step S36, and outputs an accordingly-acquired reduced-size processed image P2 to the outside of the image sensor 30 in step S37.

The size-modification unit 34 performs second reading of the full-size processed image P3 from the DRAM 32 in step S38, and directly performs an output thereof to the outside of the image sensor 30 in step S39. This is the end of the image output processing by the image sensor 30.

As described above, according to the image sensor 30, it is possible to serially output a reduced-size processed image P2 and a full-size processed image P3 to the outside from the image sensor 30. Note that the full-size processed image P3 may be output first and the reduced-size processed image P2 may be subsequently output.

Since predetermined image processing with respect to a full-size original image P1 only needs to be performed once in the image sensor 30, it is possible to control consumption of power necessary for the image processing compared to a case where image processing with respect to a full-size original image P1 is performed twice such as a case of the image sensor 20.

Fourth Configuration Example of Image Sensor of Fourth Embodiment

Figure 7:
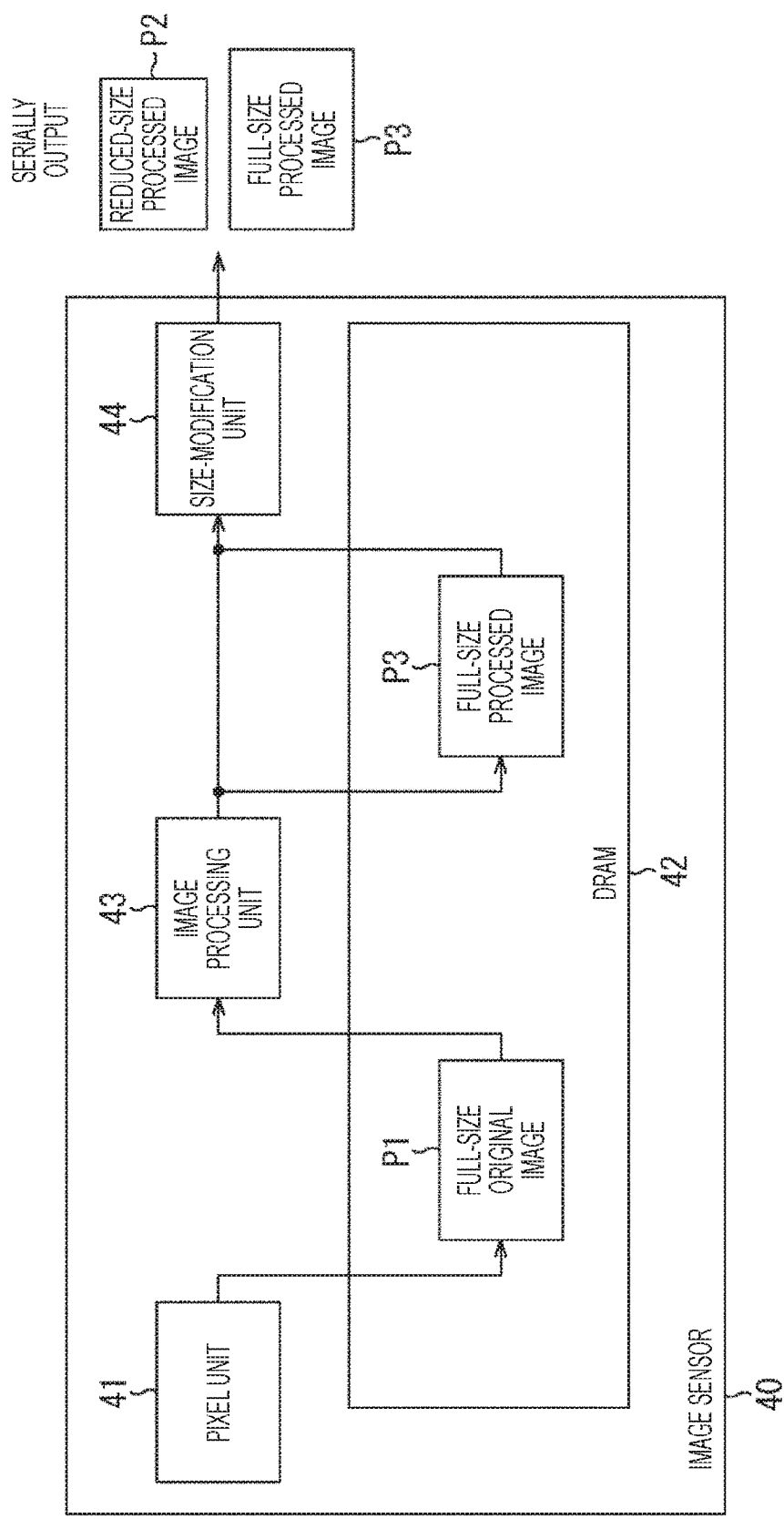
FIG. 7 is a block diagram illustrating a fourth configuration example of an image sensor to which the present disclosure is applied.

A configuration example of a fourth configuration example of an image sensor which configuration example is a fourth embodiment is illustrated in FIG. 7.

This image sensor 40 includes a pixel unit 41, a DRAM 42, an image processing unit 43, and a size-modification unit 44.

The pixel unit 41 includes many photoelectric conversion elements or the like, which generate pixel data by photoelectric conversion in response to incident light, and makes the DRAM 42 hold a full-size original image P1 acquired by imaging. The DRAM 42 is storage having a capacity capable of holding at least a full-size original image P1 and a full-size processed image P3, and responds to writing by the pixel unit 41 and the image processing unit 43 and reading by the image processing unit 43 and the size-modification unit 44.

The image processing unit 43 performs predetermined image processing such as defective pixel correction with respect to a full-size original image P1, and makes an accordingly-acquired full-size processed image P3 held in the DRAM 42 and also output to the size-modification unit 44. Note that detailed contents of the image processing in the image processing unit 43 can be arbitrarily modified according to a request from a system in which the image sensor 40 is installed.

The size-modification unit 44 generates a reduced-size processed image P2 by reducing a size of the full-size processed image P3, which is input from the image processing unit 43, into a predetermined size and performs an output thereof to a following stage. Also, the size-modification unit 44 may read the full-size processed image P3 from the DRAM 42 and may directly perform an output thereof to a following stage. Also, the size-modification unit 44 can increase a size of the full-size processed image P3 into a predetermined size or can perform deformation thereof according to a request from a system, in which the image sensor 40 is installed.

Figure 8:
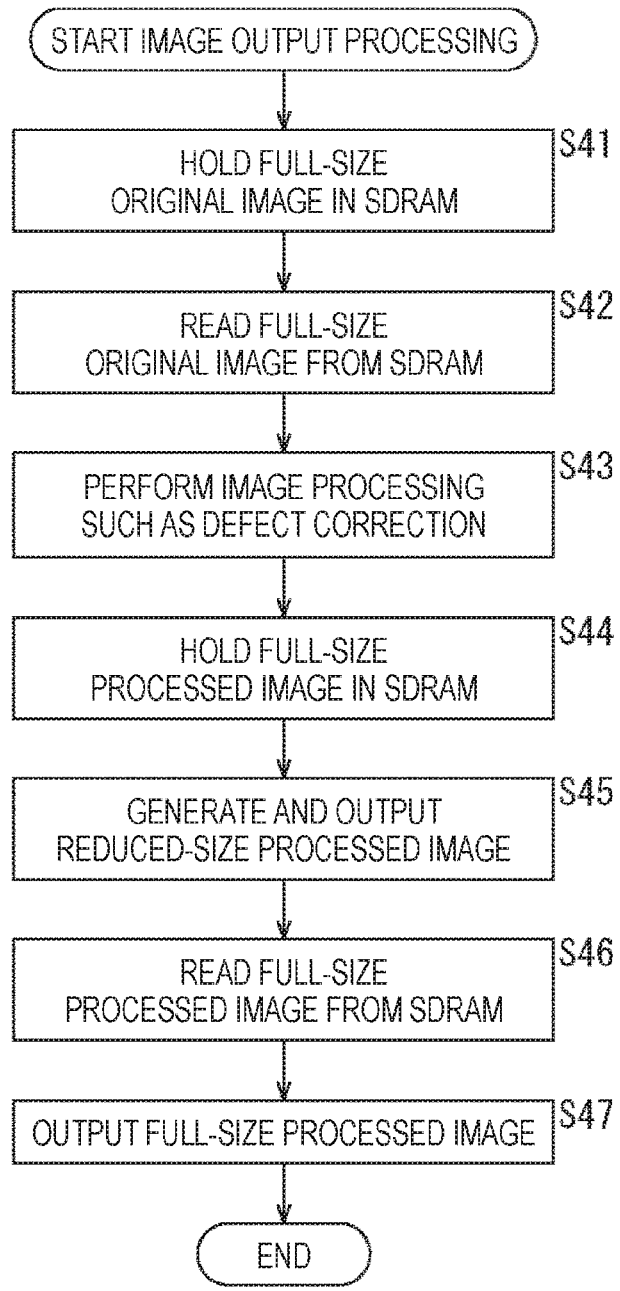
FIG. 8 is a flowchart for describing image output processing by the image sensor in FIG. 7.

FIG. 8 is a flowchart for describing image output processing by the image sensor 40.

In step S41, the pixel unit 41 generates a full-size original image P1 by exposure and makes the DRAM 42 hold the full-size original image P1.

The image processing unit 43 reads the full-size original image P1 from the DRAM 42 in step S42, performs predetermined image processing in step S43, and makes an accordingly-acquired full-size processed image P3 output to the size-modification unit 44 and also held in the DRAM 32 in step S44.

In step S45, the size-modification unit 44 reduces a size of the full-size processed image P3 into a predetermined size and outputs an accordingly acquired reduced-size processed image P2 to the outside of the image sensor 40.

The size-modification unit 44 reads the full-size processed image P3 from the DRAM 42 in step S46, and directly performs an output thereof to the outside of the image sensor 40 in step S47. This is the end of the image output processing by the image sensor 40.

As described above, according to the image sensor 40, it is possible to serially output a reduced-size processed image P2 and a full-size processed image P3 to the outside from the image sensor 40.

Since predetermined image processing with respect to a full-size original image P1 only needs to be performed once in the image sensor 40, it is possible to control consumption of power necessary for the image processing compared to a case where predetermined image processing with respect to a full-size original image P1 is performed twice such as a case of the image sensor 20.

Fifth Configuration Example of Image Sensor of Fifth Embodiment

Figure 9:
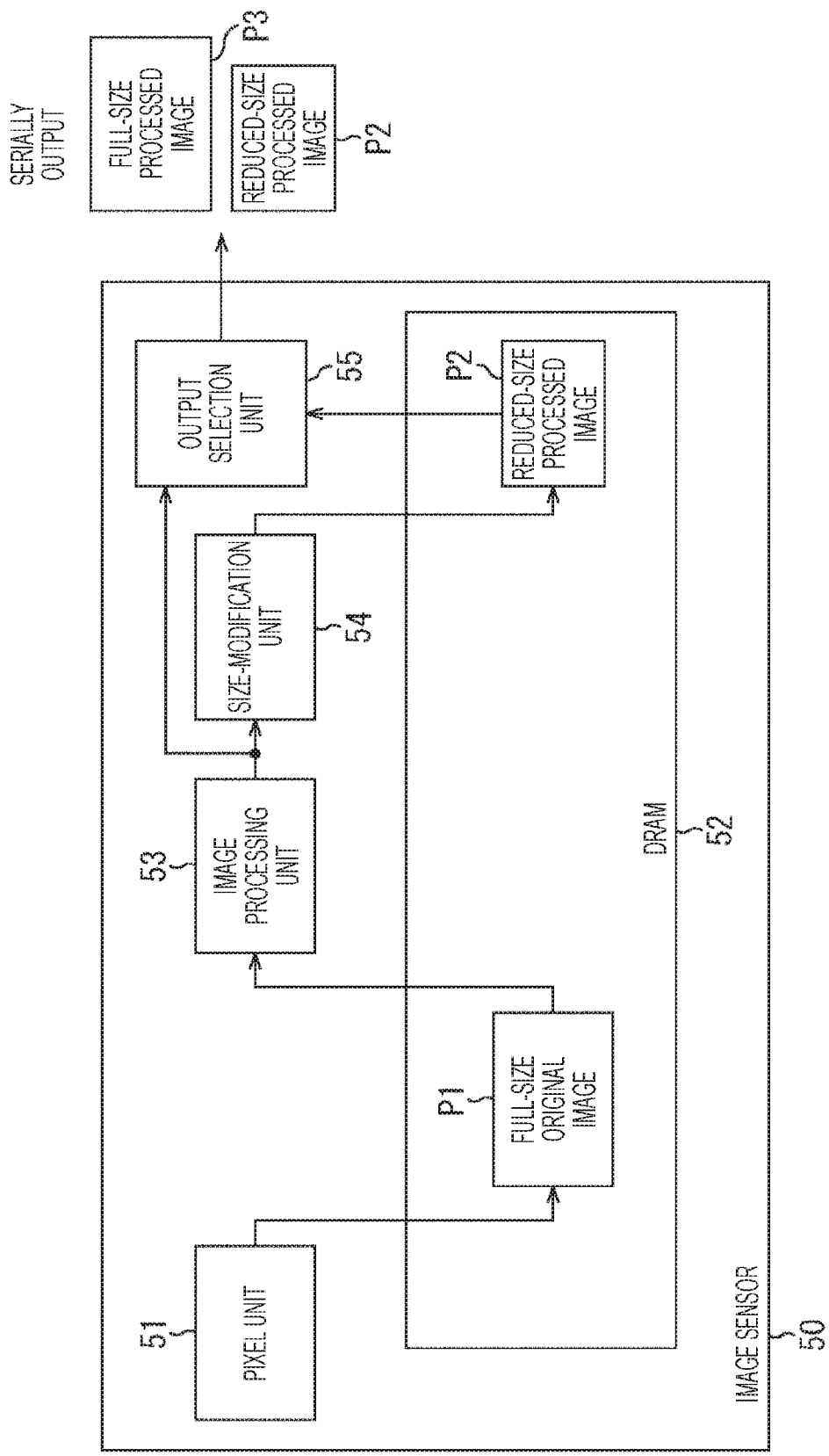
FIG. 9 is a block diagram illustrating a fifth configuration example of an image sensor to which the present disclosure is applied.

A configuration example of a fifth configuration example of an image sensor which configuration example is a fifth embodiment is illustrated in FIG. 9.

This image sensor 50 includes a pixel unit 51, a DRAM 52, an image processing unit 53, a size-modification unit 54, and an output selection unit 55.

The pixel unit 51 includes many photoelectric conversion elements or the like, which generate pixel data by photoelectric conversion in response to incident light, and makes the DRAM 52 hold a full-size original image P1 acquired by imaging. The DRAM 52 is storage having a capacity capable of holding at least a full-size original image P1 and a reduced-size processed image P2, and responds to writing by the pixel unit 51 and the size-modification unit 54 and reading by the image processing unit 53 and the output selection unit 55.

The image processing unit 53 performs predetermined image processing such as defective pixel correction with respect to a full-size original image P1, and outputs an accordingly-acquired full-size processed image P3 to the size-modification unit 54 and the output selection unit 55. Note that detailed contents of the image processing in the image processing unit 53 can be arbitrarily modified according to a request from a system in which the image sensor 50 is installed.

The size-modification unit 54 reduces a size of the full-size processed image P3, which is input from the image processing unit 53, into a predetermined size and makes the DRAM 52 hold an accordingly-acquired reduced-size processed image P2. Also, the size-modification unit 54 can increase a size of the full-size processed image P3 into a predetermined size or can perform deformation thereof according to a request from a system in which the image sensor 50 is installed.

The output selection unit 55 outputs, to a following stage, the full-size processed image P3 input from the image processing unit 53. Also, the output selection unit 55 reads the reduced-size processed image P2 from the DRAM 52 and performs an output thereof to a following stage.

Figure 10:
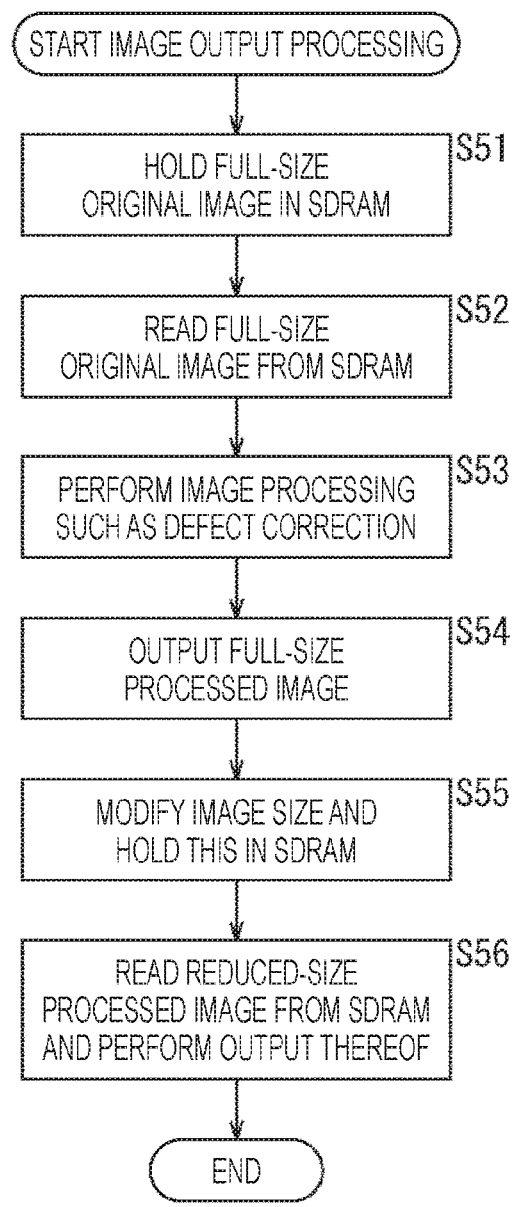
FIG. 10 is a flowchart for describing image output processing by the image sensor in FIG. 9.

FIG. 10 is a flowchart for describing image output processing by the image sensor 50.

In step S51, the pixel unit 51 generates a full-size original image P1 by exposure and makes the DRAM 52 hold the full-size original image P1.

The image processing unit 53 reads the full-size original image P1 from the DRAM 52 in step S52, and performs predetermined image processing and outputs an accordingly-acquired full-size processed image P3 to the size-modification unit 54 and the output selection unit 55 in step S53.

In step S54, the output selection unit 55 outputs, to the outside of the image sensor 50, the full-size processed image P3 input from the image processing unit 53.

In step S55, the size-modification unit 44 reduces a size of the full-size processed image P3 into a predetermined size and makes the DRAM 52 hold an accordingly acquired reduced-size processed image P2. In step S56, the output selection unit 55 reads the reduced-size processed image P2 from the DRAM 52 and performs an output thereof to the outside of the image sensor 50. This is the end of the image output processing by the image sensor 50.

As described above, according to the image sensor 50, it is possible to serially output a full-size processed image P3 and a reduced-size processed image P2 to the outside from the image sensor 50.

Since predetermined image processing with respect to a full-size original image P1 only needs to be performed once in the image sensor 50, it is possible to control consumption of power necessary for the image processing compared to a case where predetermined image processing with respect to a full-size original image P1 is performed twice such as a case of the image sensor 20.

Sixth Configuration Example of Image Sensor of Sixth Embodiment

Figure 11:
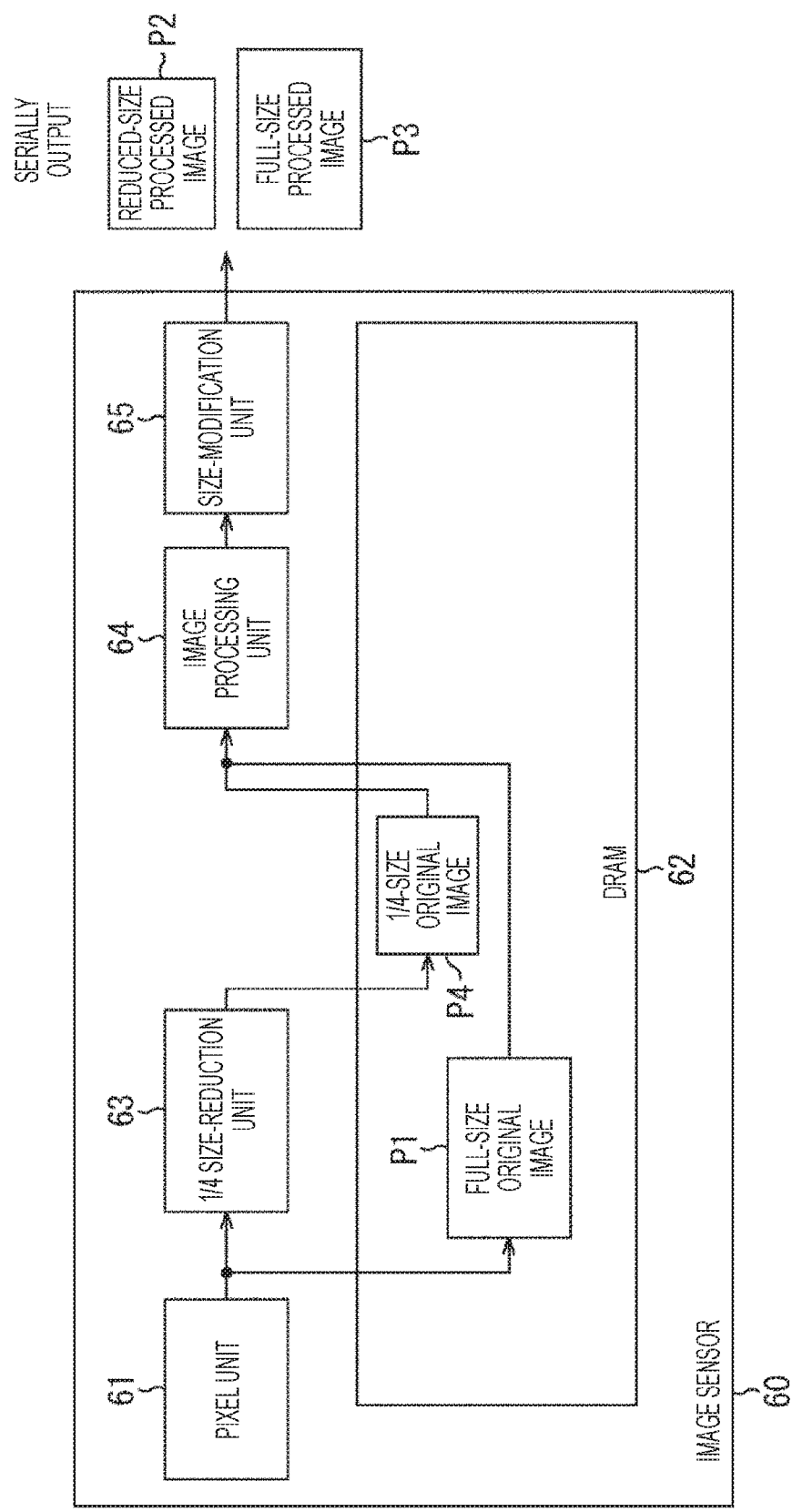
FIG. 11 is a block diagram illustrating a sixth configuration example of an image sensor to which the present disclosure is applied.

A configuration example of a sixth configuration example of an image sensor which configuration example is a sixth embodiment is illustrated in FIG. 11.

This image sensor 60 includes a pixel unit 61, a DRAM 62, a ¼ size-reduction unit 63, an image processing unit 64, and a size-modification unit 65.

The pixel unit 61 includes many photoelectric conversion elements or the like, which generate pixel data by photoelectric conversion in response to incident light, and makes a full-size original image P1, which is acquired by imaging, output to the ¼ size-reduction unit 63 and also held in the DRAM 62.

The DRAM 62 is storage having a capacity capable of holding at least, a full-size original image P1 and a ¼-size original image P4, and responds to writing by the pixel unit 61 and the ¼ size-reduction unit 63 and reading by the image processing unit 64.

The ¼ size-reduction unit 63 generates a ¼-size original image P4 by reducing a vertical and horizontal size of the full-size original image P1 into ½ and makes the DRAM 62 hold this.

The image processing unit 64 reads the ¼-size original image P4 from the DRAM 62, performs predetermined image processing such as defective pixel correction, and outputs an accordingly-acquired ¼-size processed image (not illustrated) to the size-modification unit 65. Also, the image processing unit 64 reads the full-size original image P1 from the DRAM 62, performs predetermined image processing such as defective pixel correction, and outputs an accordingly-acquired full-size processed image P3 to the size-modification unit 65.

The size-modification unit 65 converts the ¼-size processed image input from the image processing unit 64 into a predetermined size and outputs an accordingly-acquired reduced-size processed image P2 to a following stage. Also, the size-modification unit 65 directly outputs, to a following stage, the full-size processed image P3 input from the image processing unit 64.

Figure 12:
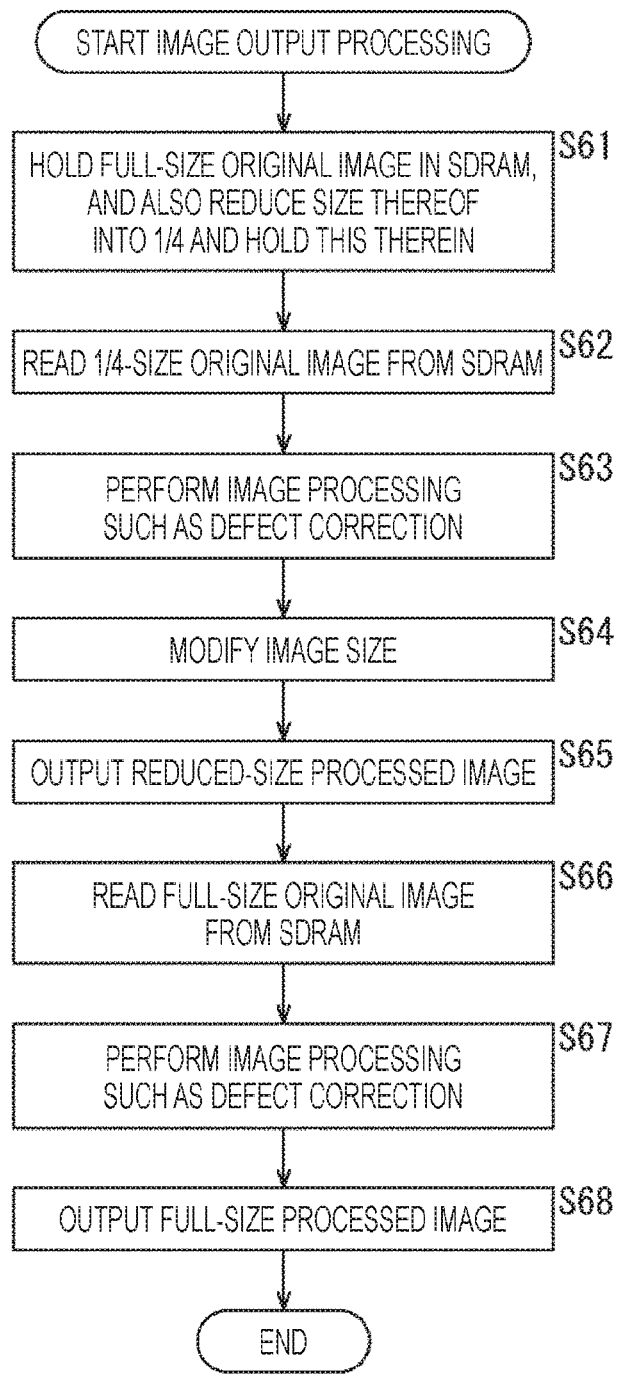
FIG. 12 is a flowchart for describing image output processing by the image sensor in FIG. 11.

FIG. 12 is a flowchart for describing image output processing by the image sensor 60.

In step S61, the pixel unit 61 generates a full-size original image P1 by exposure, and makes the full-size original image P1 output to the ¼ size-reduction unit 63 and also held in the DRAM 62. The ¼ size-reduction unit 63 generates a ¼-size original image P4 from the full-size original image P1 and makes the DRAM 62 hold this.

The image processing unit 64 reads the ¼-size original image P4 from the DRAM 62 in step S62, and performs predetermined image processing and outputs an accordingly-acquired ¼-size processed image to the size-modification unit 65 in step S63. The size-modification unit 65 converts the ¼-size processed image, which is input from the image processing unit 64, into a predetermined size in step S64, and outputs an accordingly-acquired reduced-size processed image P2 to the outside of the image sensor 60 in step S65.

The image processing unit 64 reads the full-size original image P1 from the DRAM 62 in step S66, and performs predetermined image processing and outputs an accordingly-acquired full-size processed image P3 to the size-modification unit 65 in step S67. In step S68, the size-modification unit 65 directly outputs, to the outside of the image sensor 60, the full-size processed image P3 input from the image processing unit 64, This is the end of the image output processing by the image sensor 60.

As described above, according to the image sensor 60, it is possible to serially output a full-size processed image P3 and a reduced-size processed image P2 to the outside from an image sensor 40.

Note that in the ¼ size-re duct ion unit 63, a size of a full-size original image P1 may be reduced to the same size with a reduced-size processed image P2 requested by a system in which the image sensor 60 is installed. In that case, a size-conversion unit 65 can be omitted.

Seventh Configuration Example of Image Sensor of Seventh Embodiment

Figure 13:
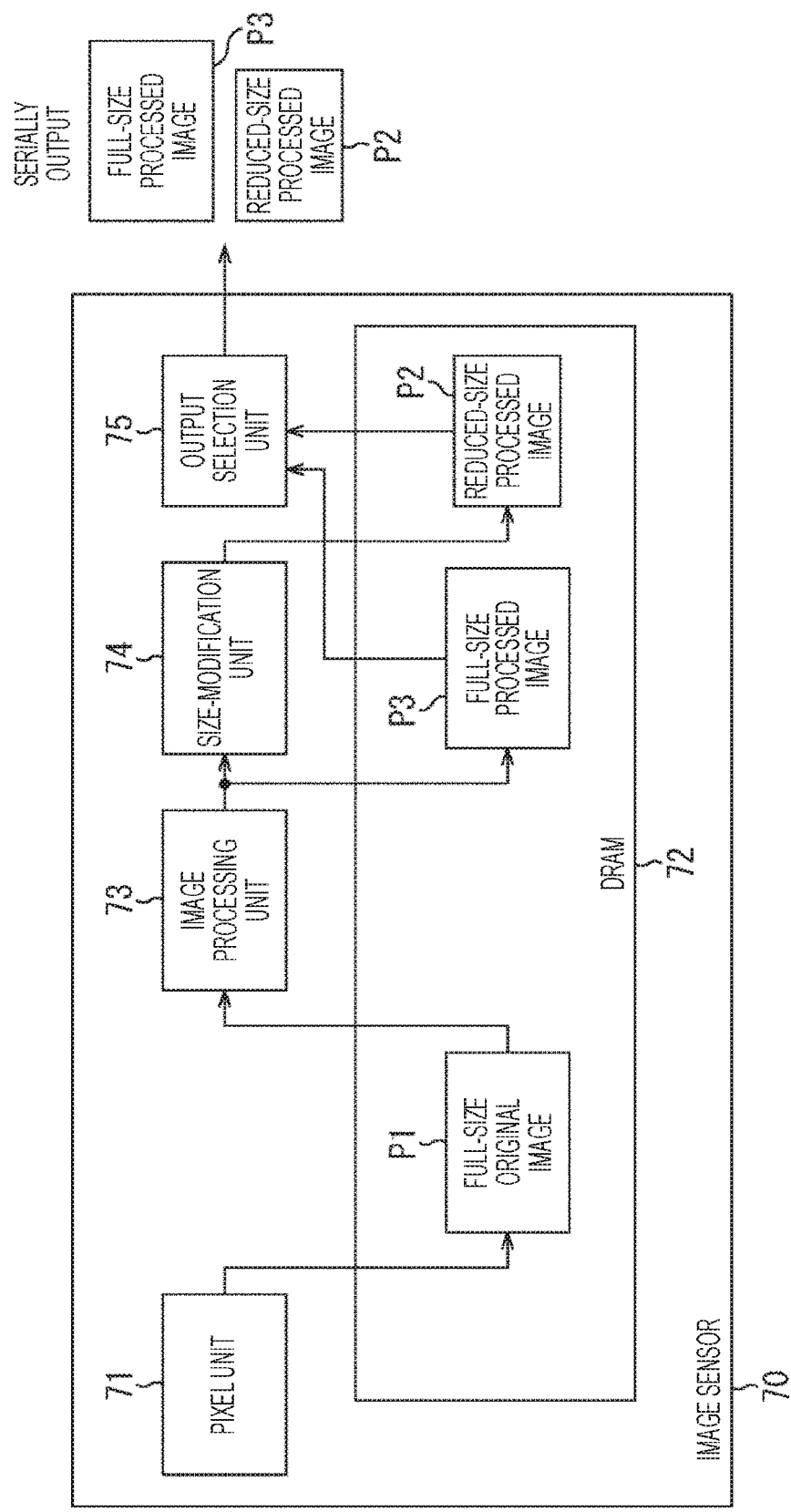
FIG. 13 is a block diagram illustrating a seventh configuration example of an image sensor to which the present disclosure is applied.

A configuration example of a seventh configuration example of an image sensor which configuration example is a seventh embodiment is illustrated in FIG. 13.

This image sensor 70 includes a pixel unit 71, a DRAM 72, an image processing unit 73, a size-modification unit 74, and an output selection unit 75.

The pixel unit 71 includes many photoelectric conversion elements or the like, which generate pixel data by photoelectric conversion in response to incident light, and makes the DRAM 72 hold a full-size original image P1 acquired by imaging. The DRAM 72 is storage having a capacity capable of holding at least a full-size original image P1, a reduced-size processed image P2, and a full-size processed image P3, and responds to writing by the pixel unit 71, the image processing unit 73, and the size-modification unit 74 and reading by the image processing unit 73 and the output selection unit 75.

The image processing unit 73 reads a full-size original image P1 from the DRAM 72, performs predetermined image processing such as defective pixel correction, and makes an accordingly-acquired full-size processed image P3 output to the size-modification unit 74 and also held in the DRAM 72. Note that detailed contents of the image processing in the image processing unit 73 can be arbitrarily modified according to a request from a system in which the image sensor 70 is installed.

The size-modification unit 74 reduces a size of the full-size processed image P3 input from the image processing unit 73 into a predetermined size, and makes the DRAM 72 hold an accordingly-acquired reduced-size processed image P2. Also, the size-modification unit 74 can increase a size of the full-size processed image P3 into a predetermined size or can perform deformation thereof according to a request from a system in which the image sensor 70 is installed.

The output selection unit 75 selectively reads a reduced-size processed image P2 or full-size processed image P3 held in the DRAM 72 and performs an output thereof to a following stage.

Figure 14:
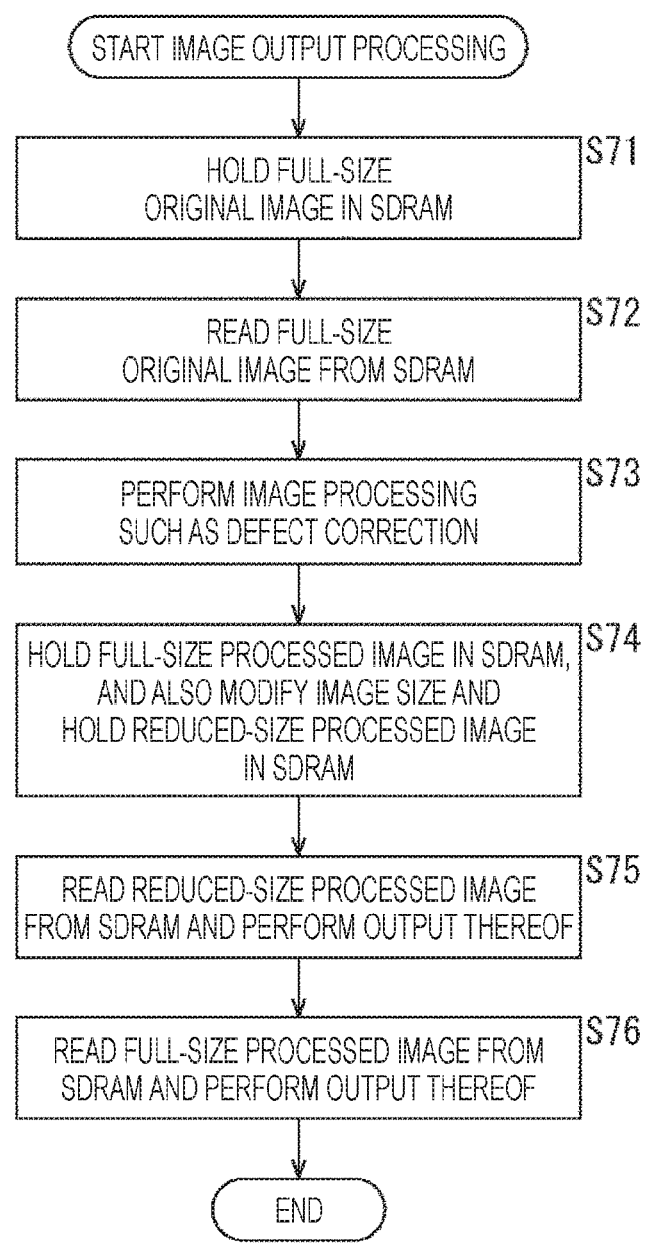
FIG. 14 is a flowchart for describing image output processing by the image sensor in FIG. 13.

FIG. 14 is a flowchart for describing image output processing by the image sensor 70.

In step S71, the pixel unit 71 generates a full-size original image P1 by exposure and makes the DRAM 72 hold the full-size original image P1.

The image processing unit 73 reads the full-size original image P1 from the DRAM 72 in step S72, performs predetermined image processing in step S73, and makes an accordingly-acquired full-size processed image P3 output to the size-modification unit 74 and also held in the DRAM 72 in step S74. A size-modification unit 44 reduces a size of the full-size processed image P3 into a predetermined size, and makes the DRAM 72 hold an accordingly-acquired reduced-size processed image P2.

In step S75, the output selection unit 75 reads the reduced-size processed image P2 from the DRAM 72 and performs an output thereof to the outside of the image sensor 70. In step S76, the output selection unit 75 reads the full-size processed image P3 from the DRAM 72 and performs an output thereof to the outside of the image sensor 70. This is the end of the image output processing by the image sensor 70.

As described above, according to the image sensor 70, it is possible to serially output a reduced-size processed image P2 and a full-size processed image P3 to the outside from the image sensor 70. Note that the full-size processed image P3 may be output first and the reduced-size processed image P2 may be subsequently output.

Usage Example of Image Sensor

According to the above-described image sensors 10 to 70, a plurality of different pieces of image data based on a full-size original image can be output. Thus, for example, there is usage for outputting a still image including all pixels during photographing of a moving image, or simultaneously outputting a preview image, in which a pixel is decimated, and an all-pixel image for recording.

Figure 15:
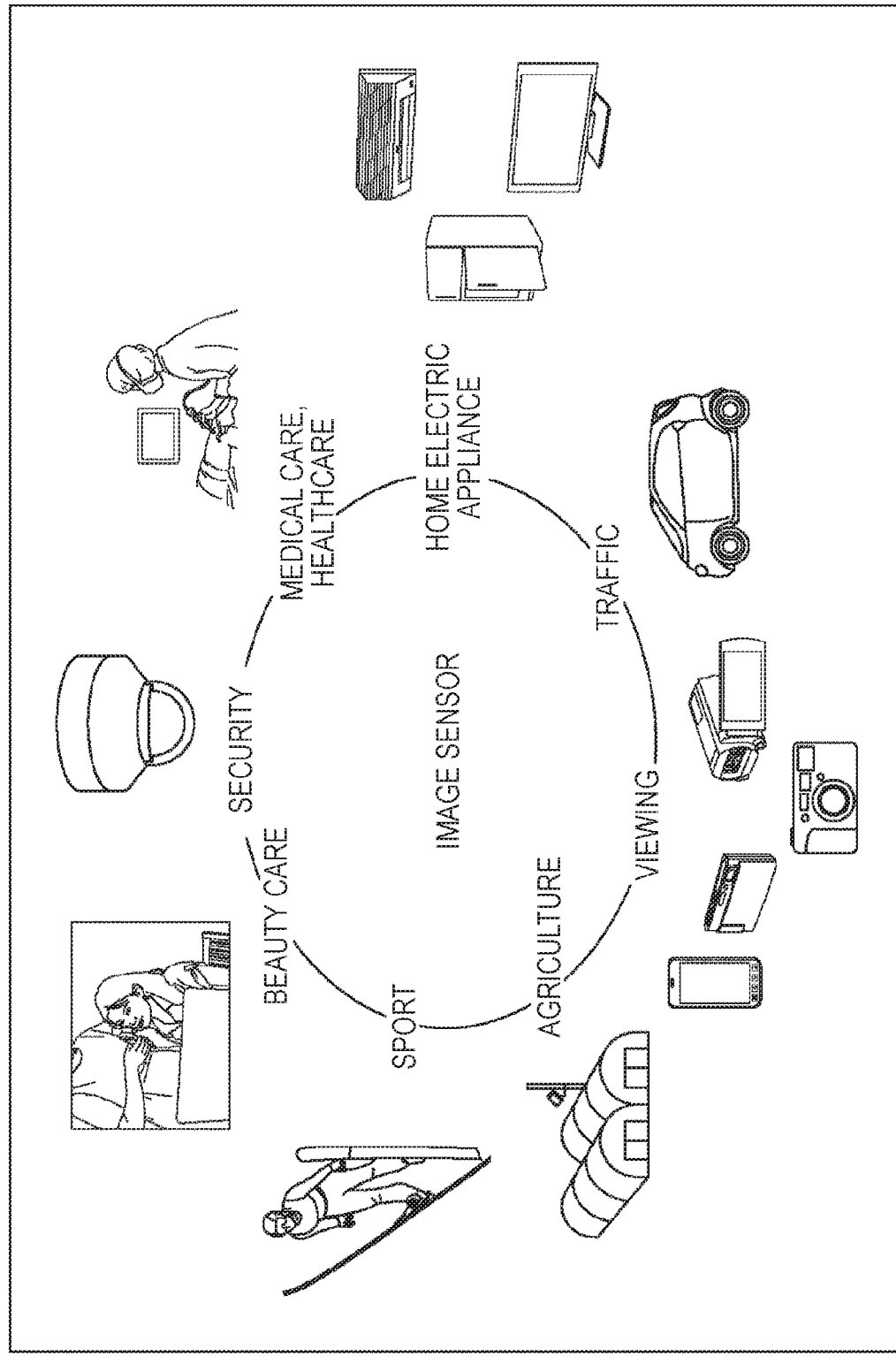
FIG. 15 is a view illustrating a usage example of an electronic device to which the present disclosure is applied.

A usage example of the image sensors 10 to 70 is illustrated in FIG. 15.

For example, the above-described image sensors 10 to 70 can be installed in various electronic devices that sense visible light, infrared light, ultraviolet light, an X-ray, and the like as described in the following.

A device, which photographs an image and is used for viewing, such as a digital camera, or a mobile device with a camera function.

A device, which is used for traffic, such as an in-vehicle sensor that photographs a front side, a back side, surroundings, the inside of a car or the like for safe driving such as automatic stopping, for recognition of a state of a driver or the like, a monitoring camera that monitors a driving vehicle or a road, or a ranging sensor that measures a distance between vehicles or the like.

A device used for a home electric appliance such as a TV, a refrigerator, or an air conditioner in order to photograph a gesture of a user and to perform device operation corresponding to the gesture.

A device, which is used for medical care or healthcare, such as an endoscope, or a device that photographs a blood vessel by reception of infrared light.

A device, which is used for security, such as a monitoring camera for crime prevention or a camera for recognizing a person.

A device, which is used for beauty care, such as a skin measuring instrument that photographs skin or a microscope that photographs a scalp.

A device, which is used for a sport, such as an action camera or a wearable camera for a sport or the like.

A device, which is used for agriculture, such as a camera for monitoring a state of a farm or a crop.

Note that an embodiment of the present disclosure is not limited to the above-described embodiments and various modifications can be made within the spirit and the scope of the present disclosure.

REFERENCE SIGNS LIST

10 Image sensor
11 Pixel unit
12 DRAM
13 Image processing unit
14 Size-modification unit
20 Image sensor
21 Pixel unit
22 DRAM
23 Image processing unit
24 Size-modification unit
30 Image sensor
31 Pixel unit
32 DRAM
33 Image processing unit 34 Size-modification unit
40 Image sensor
41 Pixel unit
42 DRAM
43 Image processing unit
44 Size-modification unit
50 Image sensor
51 Pixel unit
52 DRAM
53 Image processing unit
54 Size-modification unit
55 Output selection unit
60 Image sensor
61 Pixel unit
62 DRAM
63 ¼ size-reduction unit
64 Image processing unit
65 Size-modification unit
70 Image sensor
71 Pixel unit
72 DRAM
73 Image processing unit
74 Size-modification unit
75 Output selection unit

The invention claimed is:

1. An image sensor comprising:
a pixel unit configured to generate a full-size original image corresponding to incident light with a plurality of photoelectric conversion elements;
a holding unit having a capacity capable of holding at least the full-size original image; and
a processing unit configured to:
generate a full-size processed image by performing predetermined image processing with respect to the full-size original image read from the holding unit,
generate a modified-size processed image by modifying a size of the full-size processed image, and
output both the full-size processed image and the modified-size processed image, wherein
the processing unit is configured to generate a size-reduced original image by reducing a size of the full-size original image generated by the pixel unit,
the holding unit has a capacity capable of holding at least the full-size original image and the size-reduced original image,
the pixel unit is configured to supply the generated full-size original image to the processing unit and also to cause the holding unit to hold the generated full-size original image,
the processing unit is configured to cause the holding unit to hold the size-reduced original image generated by reduction of the size of the full-size original image,
the processing unit is configured to generate a size-reduced processed image by performing predetermined image processing with respect to the size-reduced original image read from the holding unit, and also to supply the full-size processed image generated by the predetermined image processing performed with respect to the full-size original image read from the holding unit, and
the processing unit is configured to generate the modified-size processed image by modifying a size of the supplied size-reduced processed image and to perform an output thereof, and also to directly output the supplied full-size processed image.

2. The image sensor according to claim 1, wherein
the capacity of the holding unit is capable of holding at least the full-size original image, the full-size processed image, and the modified-size processed image,
the processing unit is configured to cause the holding unit to hold the full-size processed image generated by the predetermined image processing performed with respect to the full-size original image read from the holding unit,
the processing unit is configured to cause the holding unit to hold the modified-size processed image generated by modification of the size of the full-size processed image, and
the image sensor further comprises a selective output unit configured to selectively read the full-size processed image or the modified-size processed image from the holding unit and to perform an output thereof.

3. The image sensor according to claim 1, wherein
the processing unit is configured to output the full-size processed image generated by the predetermined image processing performed with respect to the full-size original image read from the holding unit.

4. The image sensor according to claim 1, wherein
the capacity of the holding unit is capable of holding at least the full-size original image and the full-size processed image, and
the processing unit is configured to cause the holding unit to hold the full-size processed image generated by the predetermined image processing performed with respect to the full-size original image read from the holding unit.

5. The image sensor according to claim 1, wherein
the capacity of the holding unit is capable of holding at least the full-size original image and the full-size processed image, and
the processing unit is configured to cause the holding unit hold the full-size processed image.

6. The image sensor according to claim 1, wherein
the capacity of the holding unit is capable of holding at least the full-size original image and the modified-size processed image,
the processing unit is configured to output the full-size processed image generated by the predetermined image processing performed with respect to the full-size original image read from the holding unit,
the processing unit is configured to cause the holding unit to hold a modified-size processed image generated by modification of a size of the full-size processed image, and
the image sensor is configured to selectively read the modified-size processed image from the holding unit and to perform an output thereof.

7. An electronic device comprising:
an image sensor,
wherein the image sensor includes:
a pixel unit configured to generate a full-size original image corresponding to incident light with a plurality of photoelectric conversion elements;
a holding unit having a capacity capable of holding at least the full-size original image; and
an processing unit configured to:
generate a full-size processed image by performing predetermined image processing with respect to the full-size original image read from the holding unit,
generate a modified-size processed image by modifying a size of the full-size processed image, and serially or simultaneously output both the full-size processed image and the modified-size processed image, the processing unit is configured to generate a size-reduced original image by reducing a size of the full-size original image generated by the pixel unit, the holding unit has a capacity capable of holding at least the full-size original image and the size-reduced original image, the pixel unit is configured to supply the generated full-size original image to the processing unit and also to cause the holding unit to hold the generated full-size original image, the processing unit is configured to cause the holding unit to hold the size-reduced original image generated by reduction of the size of the full-size original image, the processing unit is configured to generate a size-reduced processed image by performing predetermined image processing with respect to the size-reduced original image read from the holding unit, and also to supply the full-size processed image generated by the predetermined image processing performed with respect to the full-size original image read from the holding unit, and the processing unit is configured to generate the modified-size processed image by modifying a size of the supplied size-reduced processed image and to perform an output thereof, and also to directly output the supplied full-size processed image.

8. The electronic device according to claim 7, wherein the capacity of the holding unit is capable of holding at least the full-size original image, the full-size processed image, and the modified-size processed image, the processing unit is configured to cause the holding unit to hold the full-size processed image generated by the predetermined image processing performed with respect to the full-size original image read from the holding unit, the processing unit is configured to cause the holding unit to hold the modified-size processed image generated by modification of the size of the full-size processed image, and the image sensor further comprises a selective output unit configured to selectively read the full-size processed image or the modified-size processed image from the holding unit and to perform an output thereof.

9. The electronic device according to claim 7, wherein the processing unit is configured to output the full-size processed image generated by the predetermined image processing performed with respect to the full-size original image read from the holding unit.

10. The electronic device according to claim 7, wherein the capacity of the holding unit is capable of holding at least the full-size original image and the full-size processed image, and the processing unit is configured to cause the holding unit to hold the full-size processed image generated by the predetermined image processing performed with respect to the full-size original image read from the holding unit.

11. The electronic device according to claim 7, wherein the capacity of the holding unit is capable of holding at least the full-size original image and the full-size processed image, and the processing unit is configured to cause the holding unit hold the full-size processed image.

12. The electronic device according to claim 7, wherein the capacity of the holding unit is capable of holding at least the full-size original image and the modified-size processed image, the processing unit is configured to output the full-size processed image generated by the predetermined image processing performed with respect to the full-size original image read from the holding unit, the processing unit is configured to cause the holding unit to hold a modified-size processed image generated by modification of a size of the full-size processed image, and the image sensor is configured to selectively read the modified-size processed image from the holding unit and to perform an output thereof.

* * * * *